United States Patent [19]
Schemmel

[11] Patent Number: 5,751,526
[45] Date of Patent: May 12, 1998

[54] FLUX ENHANCED WRITE TRANSDUCER AND PROCESS FOR PRODUCING THE SAME IN CONJUNCTION WITH SHARED SHIELDS ON MAGNETORESISTIVE READ HEADS

[75] Inventor: Terence D. Schemmel, Longmont, Colo.

[73] Assignee: MKE-Quantum Components Colorado LLC, Louisville, Colo.

[21] Appl. No.: 804,954

[22] Filed: Feb. 24, 1997

Related U.S. Application Data

[63] Continuation of Ser. No. 461,411, Jun. 5, 1995, abandoned.
[51] Int. Cl.$^6$ .................. G11B 5/33; G11B 5/147
[52] U.S. Cl. .................. 360/113; 360/126
[58] Field of Search .................. 360/113, 125–126

[56] References Cited

U.S. PATENT DOCUMENTS 5,264,981  11/1993  Campbell et al. .................. 360/126
5,315,469  5/1994  McNeil .................. 360/119
5,379,172  1/1995  Liao .................. 360/126
5,493,464  2/1996  Koshikawa .................. 360/113

*Primary Examiner*—Stuart S. Levy
*Assistant Examiner*—George J. Letscher
*Attorney, Agent, or Firm*—William J. Kubida; Holland & Hart LLP

[57] ABSTRACT

A flux enhanced data transducer and method for producing the same in conjunction with shared shields on MR read heads in which substantially between 500–2500 Å of a relatively higher magnetic moment material is added to the upper surface of the shared shield, or bottom write head pole, prior to a magnetic flux containment ion milling operation utilizing the upper pole as a mask. The relatively higher magnetic moment flux enhancement layer may comprise CoNiFe, FeN or similar material which is deposited prior to the formation of the dielectric gap layer. The flux enhancement layer may then be selectively removed substantially surrounding the upper pole by means of a relatively brief ion milling process in which only on the order of 1.0 kÅ of the layer need be removed and during which only an insignificant amount of the material removed might be re-deposited on the sides of the upper pole.

15 Claims, 4 Drawing Sheets

FLUX ENHANCED WRITE TRANSDUCER AND PROCESS FOR PRODUCING THE SAME IN CONJUNCTION WITH SHARED SHIELDS ON MAGNETORESISTIVE READ HEADS

This application is a continuation of Ser. No. 08/461,411 filed Jun. 5, 1995, now abandoned.

CROSS REFERENCE TO RELATED APPLICATIONS

The present invention is related to the subject matter of U.S. Pat. No. 5,532,892 for "Soft Adjacent Layer Biased Magnetoresistive Device Incorporating a Natural Flux Closure Design Utilizing Coplanar Permanent Magnet Thin Film Stabilization" and U.S. Pat. No. 5,573,809 for "Process for Forming a Soft Adjacent Layer Biased Magnetoresistive Device Incorporating a Natural Flux Closure Design Utilizing Coplanar Permanent Magnet Thin Film Stabilization", both filed concurrently herewith and assigned to Rocky Mountain Magnetics, Inc., assignee of the present invention. The disclosures of the foregoing patent applications are herein specifically incorporated by this reference.

BACKGROUND OF THE INVENTION

The present invention relates, in general, to the field of magnetic data transducers and methods for producing the same. More particularly, the present invention relates to a flux enhanced write transducer and process for producing the same of especial utility in conjunction with shared, or merged, shields on magnetoresistive ("MR") read heads.

Magnetoresistive heads, or sensors, are known to be useful in reading data from a magnetic surface with a sensitivity exceeding that of inductive or other thin film heads. In operation, an MR sensor is used to detect magnetic field signal changes from a magnetic surface due to the fact that the resistance of the MR sensor changes as a function of the direction and amount of magnetic flux being sensed.

Currently, the magnetic field signal changes encoded on the magnetically hard surface of a computer mass storage medium which are to be "read" by an MR read head are "written" by an associated write head. In those instances when the MR read head has associated shield layers, as described in the aforementioned patent applications for example, the write head may utilize the top shield as a bottom pole producing what is known as a merged, or shared shield/pole structure.

In these combined read/write data transducer structures, it has been shown that the area of greatest magnetic flux in the shared shield/pole may move around within that layer from the area immediately beneath the upper pole of the write head adjacent the intermediate dielectric gap layer. In parametric terms, the write track would wander and fringe fields might result wherein a write may take place toward the side of a given track that might then erroneously be read as data from the adjacent track. Reduction of track wander and associated fringe fields is increasingly important as track spacing is decreased in an attempt to increase the areal density of a magnetic computer mass storage device.

As a consequence, it has previously been proposed to remove portions of the upper surface of the shared shield/pole surrounding the upper pole and gap layer by, for example, "notching" the shield/pole by ion milling (using the upper pole as a mask), to reduce its thickness to better confine the flux to the desired region. However, due to the fact that the shield must be milled down on the order of about a micron ("μ") or more to effectuate the desired flux constraint, a typical ion milling operation could take on the order of 60 minutes or longer of device processing time. This protracted ion milling of the shared shield/pole and upper pole surface may result in potentially damaging heat build up in the device structure during the process and it has been found that the resultant slope of the surface achieved in this manner is, for the most part, too long and therefore ineffective in confining the magnetic flux as needed.

Moreover, due to removal of this relatively large amount of shield, pole and gap layer material during the milling process, a significant amount of it will subsequently get re-deposited throughout the processing system and ultimately build up on the sides of the upper pole possibly further degrading device function. Build up of approximately one half of the ion milled gap, shield and pole material has been typically observed.

SUMMARY OF THE INVENTION

The present invention obviates the problems inherent in the aforedescribed flux containment approaches by advantageously proposing the addition of a relatively thin (on the order of about 500–2500 angstroms ("Å")) layer of a relatively high magnetic moment material to the upper surface of the shared shield, or bottom write head pole, prior to the ion milling operation. In a particular embodiment herein disclosed, the relatively high magnetic moment flux enhancement layer may comprise cobalt-nickel-iron ("CoNiFe"), iron nitride ("FeN") or similar material deposited prior to the formation of the dielectric gap layer. The flux enhancement layer may then be selectively removed substantially surrounding the upper pole, using the upper pole as a mask, by means of a relatively brief ion milling process in which only on the order of 1.0 kÅ of the layer need be removed and during which a relatively insignificant amount of the material removed might be re-deposited on the sides of the upper pole.

In accordance with a more specific embodiment of the present invention, a similar relatively high magnetic moment material may be utilized as a seed layer deposition prior to the plating of the upper pole to provide additional flux containment functionality to the flux enhancement layer intermediate the dielectric gap and shared shield/pole.

Broadly, what has been disclosed is a data transducer of the type having first and second magnetic poles and an intermediate gap layer, wherein the improvement comprises incorporating an additional layer of relatively higher magnetic moment material interposed between the first magnetic pole and the gap layer. The additional layer underlies the gap layer and is substantially coextensive therewith.

Further disclosed is a magnetic data transducer incorporating a read head interposed between upper and lower magnetic shield layers and a write head utilizing the upper magnetic shield layer as a bottom magnetic pole. The data transducer comprises a relatively higher magnetic moment layer overlying a portion of the upper magnetic shield layer, a gap layer in an overlying relationship to the relatively higher magnetic moment layer, and an upper magnetic pole in an overlying relationship to the gap layer.

In accordance with a method of the present invention there is disclosed a process for forming a magnetic data transducer comprising the steps of providing a first magnetic pole and overlying a relatively higher magnetic moment layer on a portion of the first magnetic pole. A gap layer is produced in an overlying relationship to the relatively higher magnetic moment layer and substantially coextensive there-

3 with and a second magnetic pole is formed in an overlying relationship to the gap layer.

BRIEF DESCRIPTION OF THE DRAWINGS

The foregoing and other features and objects of the present invention will become more apparent, and the invention itself will be best understood by reference to the following description of a preferred embodiment, taken in conjunction with the accompanying drawings, wherein.

DESCRIPTION OF A PREFERRED EMBODIMENT

Figure 1A:
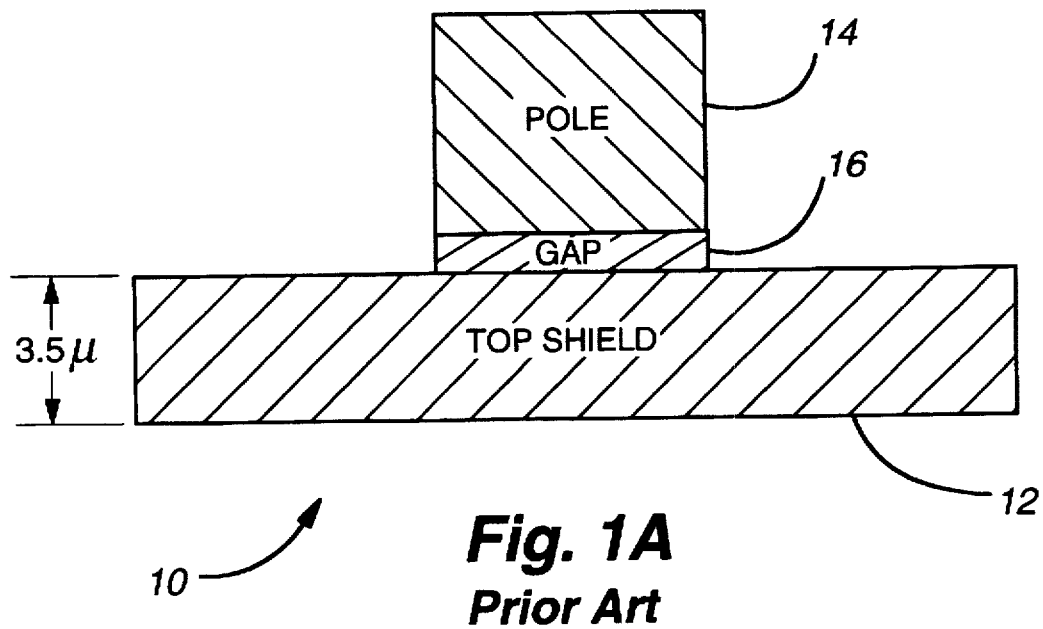
FIG. 1A is a simplified, cross sectional, air bearing surface ("ABS") view of the write portion of a prior art data transducer which utilizes a shared, or merged, shield for an MR read sensor as one pole thereof wherein the area of greatest flux within the shared shield/pole is able to move around within the shield from a position generally beneath the upper pole thereof.

With reference now to FIG. 1A, a prior art write head 10 is shown. The prior art write head 10 comprises, in pertinent part, a top shield 12 which functions as a bottom pole for the write head 10 portion of a data transducer incorporating a read head (not shown) interposed between a lower shield (not shown) and the top shield 12. The top shield 12 may comprise nickel iron ("NiFe") or other suitable magnetically permeable material.

The prior art write head 10 further comprises an upper pole 14, which may also comprise NiFe, separated from the top shield 12 by means of a gap layer 16. The gap layer 16 may comprise alumina ("Al$_2$O$_3$") or other similar dielectric material.

With reference to the prior art write head 10 shown, it has been found that the magnetic flux in the top shield 12 may wander unpredictably throughout the structure thereof resulting in undesired fringe fields that might possibly result in data being written to the sides of a desired track centerline such that spurious signals may be read on adjacent tracks.

Figure 1B:
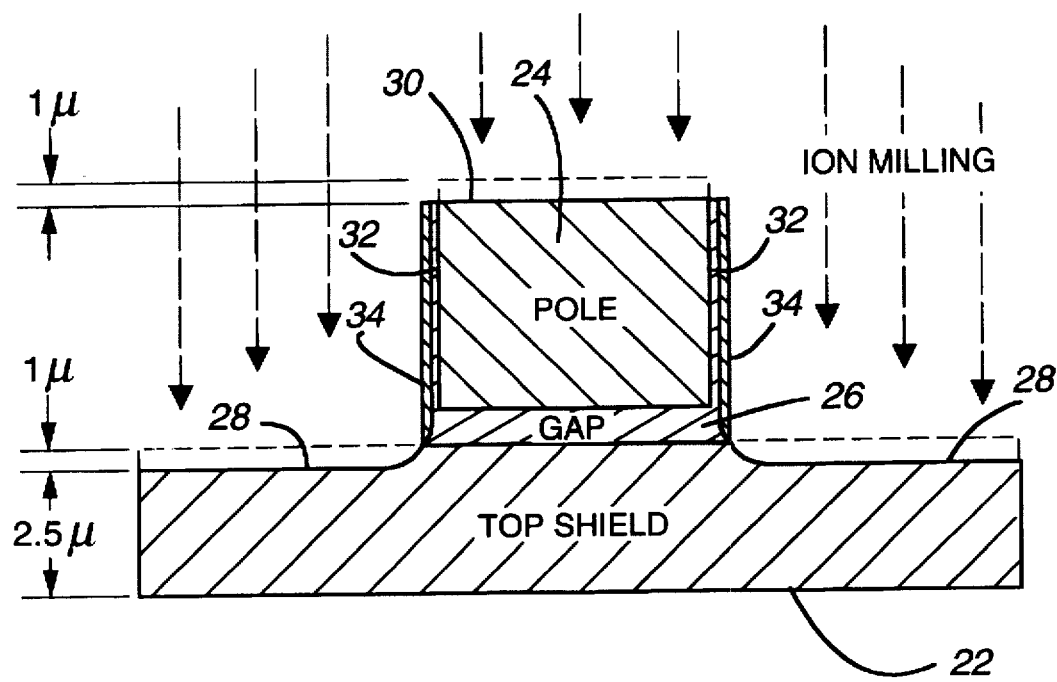
FIG. 1B is a follow-on ABS view of the prior art data transducer of FIG. 1A illustrating the removal of portions of the upper surface of the shared shield/pole as well as the surface of the upper pole and gap layer by an ion milling operation in order to attempt to preclude the movement of the flux within the shared shield/pole layer to an area substantially underlying the upper pole and in which a significant amount of the gap and shield material is unintentionally re-deposited on the sides of the upper pole while the lengthy ion milling operation is conducted.

To this end, it has been proposed as shown in FIG. 1B, to alter the structure of the prior art write head 10 to that of the prior art write head 20 by means of, for example, an ion milling operation to "notch" the device structure in an attempt to constrain the magnetic flux to a desired location. Prior art write head 20 includes a top shield 22, corresponding upper pole 24 and intermediate gap layer 26 in a manner similar to the prior art write head 10 shown in FIG. 1A.

By means of an ion milling operation, the prior art write head 10 shown in FIG. 1A may be altered to the configuration of the prior art write head 20 shown in FIG. 1B wherein one micron of the top shield 22 upper surface 28 is removed surrounding the upper pole 24 using it as a milling mask. For example, if the top shield 12 of prior art write head 10 is ion milled whereby one micron (1μ) of the shield upper surface 28 is removed, the top shield 22 will have a resultant thickness of 2.5 microns at the extremities thereof. In like manner, the ion milling operation also removes 1μ from the pole upper surface 30 of the upper pole 24 resulting in a structure that is on the order of 4.0 microns square.

The ability to effectively constrain the magnetic flux within the top shield 22 has been shown to be a function of the amount of material removed from the shield upper surface 28 in the area surrounding the upper pole 24, tapering to the area directly beneath it. Removal of 1μ of the shield material has been found to take on the order of 50 minutes of ion milling which, in addition to the rather long processing step it presents, also results in an undesirable build up of heat within the prior art write head 20 and associated data transducer structure which may possibly result in device failure. Moreover, the slope imparted to the shield upper surface 28 by the ion milling operation adjacent the upper pole 24 is relatively long and the flux containment thereby imparted is not as effective as might be desired.

Significantly, the material removed from the shield upper surface 28 and the gap layer 26 is undesirably re-deposited on the sides of the upper pole 24 as well. In this regard, the upper pole 24 then presents re-deposited gap material 32 as well as re-deposited shield material 34. This re-deposited material alters the characteristics of the write head 20 and can significantly impact its effectiveness as a data write transducer. It has been found that approximately one-half of the material removed from the top shield 22 and gap layer 26 ultimately gets redeposited on the sides of the pole 24.

Figure 2:
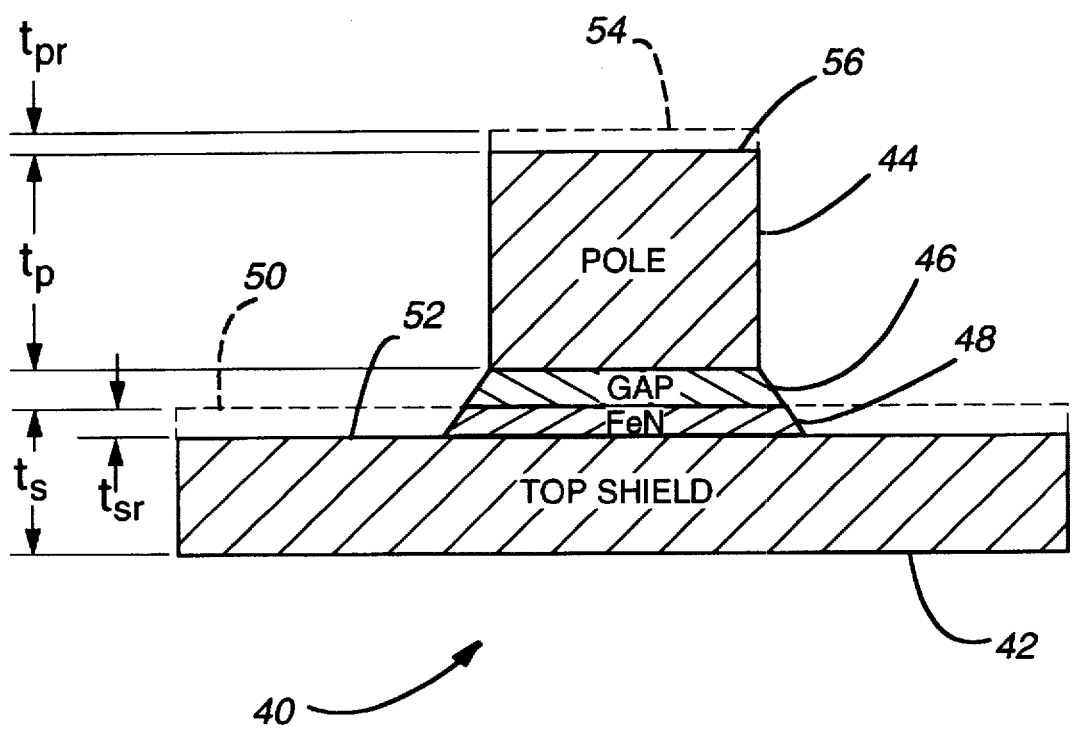
FIG. 2 is a simplified, cross sectional ABS view of the write portion of a flux enhanced transducer in accordance with the present invention illustrated as a portion of a data transducer which utilizes a shared, or merged, shield for an MR read sensor as one pole thereof wherein a flux enhancement layer has been produced intermediate the shared shield/pole and the gap layer prior to an ion milling operation wherein a shorter milling operation can be undertaken to preclude movement of the flux within the shared shield/pole resulting in negligible re-deposition of the device materials on the sides of the upper pole.

With reference additionally now to FIG. 2, a flux enhanced transducer 40 in accordance with the present invention is shown. The flux enhanced transducer 40 comprises, in pertinent part, a top shield 42 functioning as a bottom pole for the flux enhanced transducer 40. An upper pole 44 is physically displaced from the top shield 42 by means of a dielectric gap layer 46 and a flux enhancement layer 48. The top shield 42 and upper pole 44 may comprise NiFe, the gap layer may comprise non-stoichiometric Al$_2$O$_3$ of on the order of approximately 4,000 Å or other suitable material and flux enhancement layer 48 may comprise FeN, CoNiFe or other similar relatively higher magnetic moment materials having a thickness of on the order of 500–2500 Å, and nominally about 1,000 Å.

The flux enhanced transducer 40 top shield 42 shown may have been initially provided with a blanket deposited flux enhancement layer 48 up to the pre-milled surface plane 50 thereby presenting a thickness of $t_s$. Following an ion milling operation, the thickness of the flux enhancement layer 48 in the area substantially surrounding the upper pole 44 was removed down to the shield surface plane 52 resulting in a reduction in the top shield thickness $t_s$ of $t_{sr}$. Similarly, the upper pole 44 has been reduced by an ion milling operation from a pre-milled surface plane 54 to a pole surface plane 56. The after-milled thickness of the upper pole 44 is $t_p$ and the amount of material removed from the upper pole 44 is designated as $t_{pr}$.

In the embodiment shown, $t_s$ would be on the order of 3.5 microns while the value of $t_{sr}$ would be on the order 1.0 kÅ. In like manner, the upper pole 44 thickness $t_p$ would be on the order of 4.0 microns and the value of $t_{pr}$ would also be approximately 1.0 kÅ.

A more detailed process flow for possible construction of the flux enhanced transducer 40 illustrated in FIG. 2 will be shown and described with respect to the succeeding Figures. However, it should be noted that the flux enhanced transducer 40 may be constructed through other processes which would not require the use of an ion milling or other material removal operation to provide substantially the structure shown in FIG. 2 with respect to the relationship between the upper pole 44, gap layer 46 and flux enhancement layer 48 overlying a bottom pole or top shield 42.

Figure 3A:
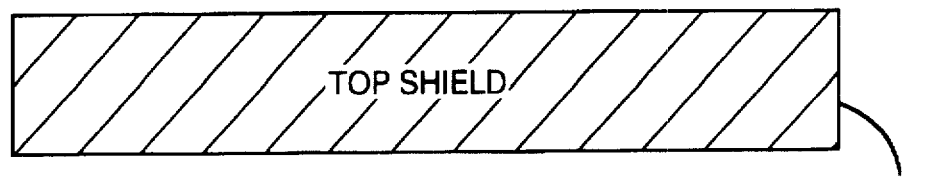
FIGS. 3A–3G are a series of simplified cross sectional ABS views of a possible processing sequence in accordance with the present invention for producing the flux enhanced transducer of FIG. 2 utilizing a single photolithographic step and ion milling operation.

With reference now to FIG. 3A, a top shield layer 60 is shown. The shield layer 60 may comprise plated NiFe or other similar magnetically permeable material. The shield layer 60 may comprise a portion of a read/write data transducer incorporating a magnetoresistive read sensor wherein the shield layer 60 comprises a shared (or merged) shield/pole substantially as disclosed in the aforementioned United States patent applications. The plating on the shared shield may be defined through a photoresist operation (not shown) which photoresist is thereafter stripped away in preparation for subsequent processing steps.

Figure 3B:
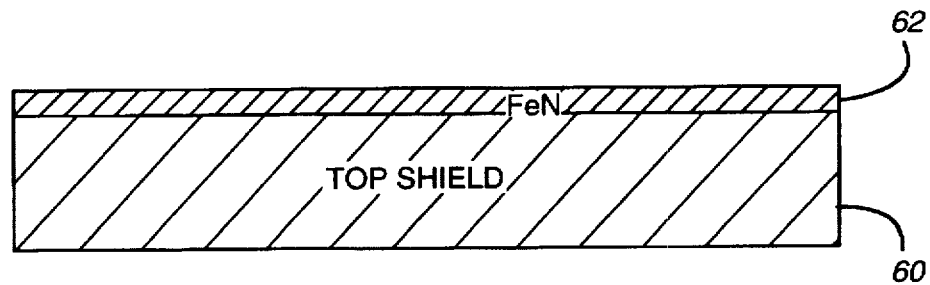

With reference additionally now to FIG. 3B, a flux enhancement layer 62 is deposited on the upper surface of the shield layer 60 to a thickness of between 500 to 2,500 Å. In a preferred embodiment, the flux enhancement layer 62 may comprise FeN deposited nominally to a thickness of 1.0 kÅ. Thereafter, another photo definition step (not shown) may be undertaken to emulate the physical dimensions of the shield layer 60 followed by an ion milling operation of the FeN flux enhancement layer 62 for on the order of 3 minutes to remove excess FeN from areas other than those at which it is desired to place the flux enhancement layer 62. Thereafter, the photoresist may be stripped away.

Figure 3C:
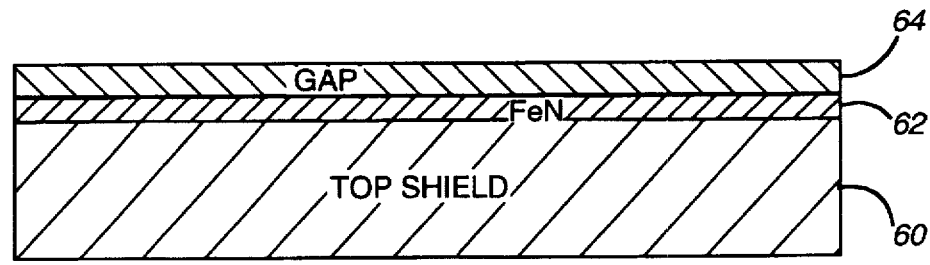

With reference additionally now to FIG. 3C, a gap layer 64 is deposited to a thickness of on the order of 4,000 Å. The gap layer 64 may comprise $Al_2O_3$, or other similar dielectric materials suitable for producing the same. Following the process step shown in FIG. 3C, a back gap photo definition step may be undertaken followed by an etch of the back gap (not shown) utilizing, for example, phosphoric acid. The photoresist utilized to define the back gap may then be stripped followed by a number of planar and coil define and deposition steps necessary to lay down the coils.

Figure 3D:
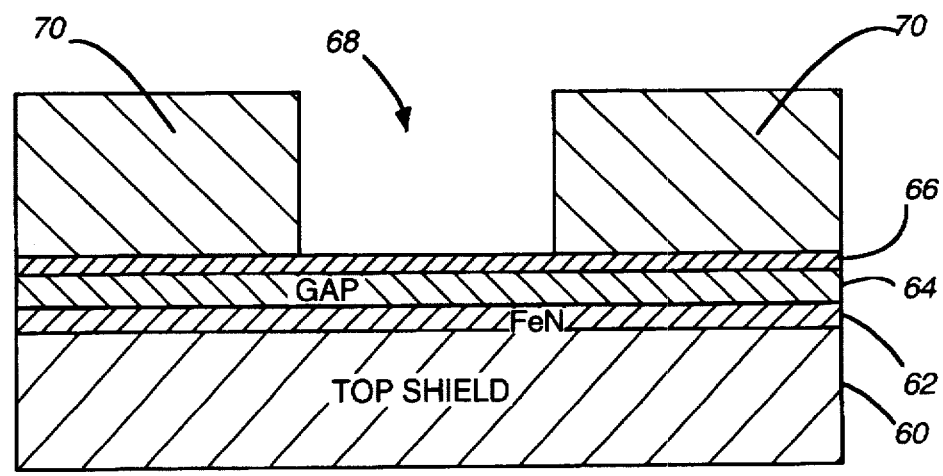

With reference additionally to FIG. 3D, a seed layer 66 is deposited on the upper surface of the gap layer 64. The seed layer 66 may comprise approximately 1.0 Å of NiFe, or, in an alternative embodiment operative in association with the flux enhancement layer 62 to further desirably constrain the magnetic flux within the shield layer 60, the seed layer 66 may also comprise FeN or other relatively higher magnetic moment material such as CoNiFe.

An aperture 68 in which the upper pole of the device will be formed is defined by means of photoresist 70 which is patterned and baked on top of the seed layer 66 substantially as shown in FIG. 3D.

Figure 3E:
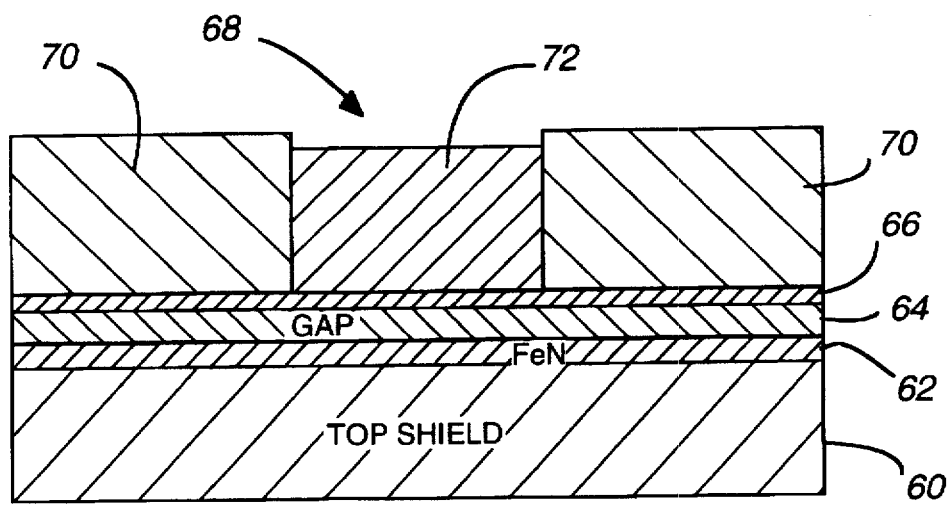

With reference additionally now to FIG. 3E, the upper pole 72 is plated within the aperture 68 defined by the photoresist 70 on top of that portion of the seed layer 66 exposed within the aperture 68. The plating operation for the upper pole 72 takes place sufficiently to form the desired thickness (allowing for any subsequent material removal step such as ion milling) for the upper pole 72 to a point below the upper surface of the photoresist 70.

Figure 3F:
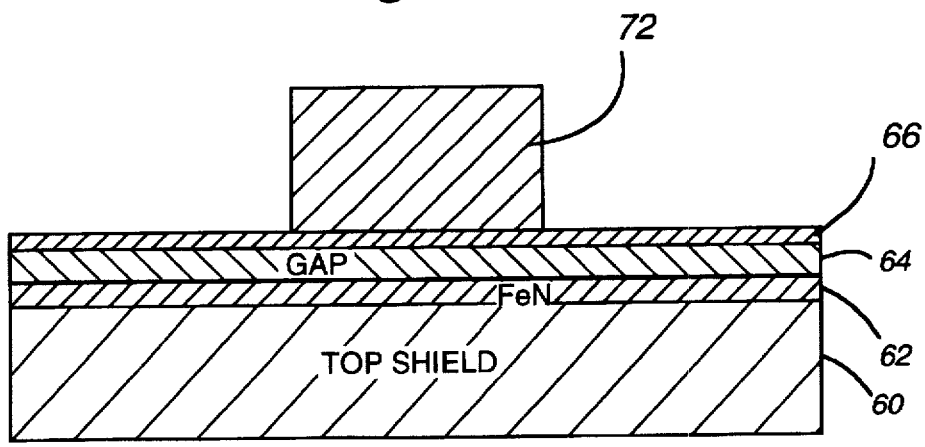

With reference additionally now to FIG. 3F, the photoresist shown in the preceding FIG. 3E is stripped away to leave the structure shown. At this point, additional processing steps to photo define the notch area (not shown) may take place.

Figure 3G:
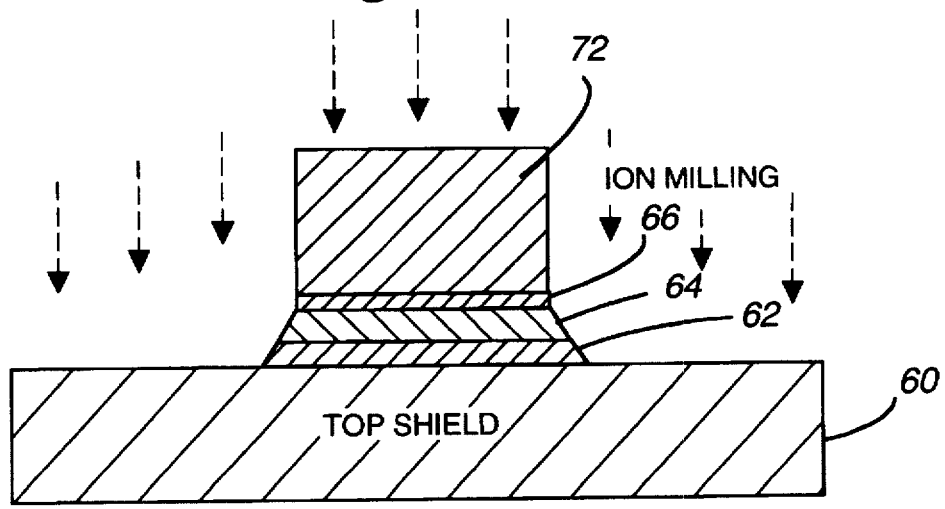

With reference additionally now to FIG. 3G, the seed layer 66, gap layer 64 and flux enhancement layer 62 are ion milled utilizing the upper pole as a mask to produce the device structure substantially as shown. In operation, it has been found that the seed layer 66 and gap layer 64 may be ion milled for approximately 30 minutes while the flux enhancement layer 62 is further ion milled for an additional 3 minutes. Since the upper pole 72 is likewise subject to the ion milling operation, the thickness of the upper pole 72 established during the plating operation illustrated in FIG. 3E, should be increased such that the resultant thickness of the upper pole 72 in FIG. 3G is of the desired thickness following the ion milling operation. A chemical etch process may also be used in lieu of the ion milling operation disclosed.

Following the ion milling operation illustrated in FIG. 3G, any remaining photoresist should be stripped and the standard processing steps undertaken to complete the fabrication of the data transducer.

While there have been described above, the principles of the present invention in conjunction with specific device structures and processes, it is to be clearly understood that the foregoing description in made only be way of example and not as a limitation to the scope of the invention. Particularly, while the present invention has been described with respect to the use of a flux enhancement layer on a shared shield/pole, the use of a relatively higher magnetic moment layer in the same manner on a bottom pole of a write head not forming a portion of a shared shield is also within the contemplation hereof. Moreover, while FeN and CoNiFe have been described as examples of materials which may be utilized to form the flux enhancement layer, other relatively higher magnetic moment materials may also be used in addition thereto or in substitution therefor. Still further, while the flux enhancement layer is shown as having been applied in a blanket deposition process followed by a material removal step such as ion milling, other material removal processes may be utilized or the profile of the upper surface of the bottom pole and flux enhancement layer may be established by means other than material removal including its construction by means of various masking steps and deposition operations.

What is claimed is:

1. A magnetic data transducer of the type having a first magnetic pole member that has a width and is formed of a magnetic material having a magnetic moment, having a second magnetic pole member that is formed of a magnetic material having a magnetic moment, said second magnetic pole member being of a smaller width than said first magnetic pole member, said second magnetic pole member being spaced from and overlying a mid portion of said width of said first magnetic pole member, said second magnetic pole member forming a magnetic flux gap with said first magnetic pole member, and a nonmagnetic gap layer that is located intermediate said first and second magnetic pole members and is substantially coextensive with said smaller width of said second magnetic pole member, the improvement, in combination, comprising:

an flux enhancement magnetic layer that is formed of a material having a magnetic moment that is higher than said magnetic moment of said first-magnetic pole member, said additional magnetic layer being located directly on said mid portion of said first magnetic pole member and interposed between said first magnetic pole member and said nonmagnetic gap layer so as to be substantially coextensive with said smaller width of said second magnetic pole member, said additional magnetic layer underlying said nonmagnetic gap layer and being substantially coextensive therewith whereby said flux enhancement magnetic layer and said smaller width second magnetic pole member cooperate to substantially constrain magnetic flux within said first magnetic pole member.

2. The data transducer of claim 1 wherein said first and second magnetic pole members have generally equal magnetic moments.

3. The data transducer of claim 1 wherein said nonmagnetic gap layer comprises a dielectric material.

4. The data transducer of claim 3 wherein said dielectric material comprises $Al_2O_3$.

5. The data transducer of claim 1 wherein said first and second magnetic pole members are formed of NiFe, wherein said nonmagnetic layer comprises $Al_2O_3$, and wherein said additional magnetic layer is selected from a group consisting essentially of FeN or CoNiFe and is substantially between 500–2500 Å in thickness.

6. The data transducer of claim 1 wherein said additional magnetic layer is substantially between 500–2500 Å in thickness.

7. A magnetic data transducer incorporating a read head that is interposed between an upper magnetic shield layer having a magnetic moment, and a lower magnetic shield layer having a magnetic moment, and incorporating a write head that utilizes said upper magnetic shield layer as a bottom magnetic pole member, said upper magnetic shield layer having a width, and said write head comprising:

a flux enhancement layer having a width that is smaller than said width of said upper magnetic shield layer directly on and overlying a mid portion of said width of said upper magnetic shield layer, said flux enhancement layer having a magnetic moment that is higher than said magnetic moment of said upper magnetic shield layer;

a gap layer having a width that is generally equal to said smaller width of said flux enhancement layer directly on and overlying said flux enhancement layer; and an upper magnetic pole member having a width that is generally equal to said width of said gap layer directly on and overlying said gap layer, said upper magnetic pole member having a magnetic moment whereby said upper magnetic pole member and said flux enhancement layer cooperate to substantially constrain magnetic flux within said upper magnetic shield layer.

8. The data transducer of claim 7 wherein said upper magnetic shield layer and said upper magnetic pole member comprise NiFe.

9. The data transducer of claim 7 wherein said gap layer comprises a dielectric material.

10. The data transducer of claim 9 wherein said dielectric material comprises $Al_2O_3$.

11. The data transducer of claim 7 wherein said flux enhancement layer is selected from a group consisting essentially of FeN or CoNiFe.

12. The data transducer of claim 7 wherein said flux enhancement layer is substantially between 500–2500 Å in thickness.

13. A magnetic data transducer of the type having a first magnetic pole member that has a width and is formed of a magnetic material having a magnetic moment, having a second magnetic pole member that is formed of a magnetic material having a magnetic moment, said second magnetic pole member being of a smaller width than said first magnetic pole member, said second magnetic pole member being spaced from and overlying a mid portion of said width of said first magnetic pole member, said second magnetic pole member forming a magnetic flux gap with said first magnetic pole member, and a nonmagnetic gap layer that is located intermediate said first and second magnetic pole members and is substantially coextensive with said smaller width of said second magnetic pole member, the improvement, in combination, comprising:

an additional magnetic layer that is formed of a material having a magnetic moment that is higher than said magnetic moment of said first magnetic pole member, said additional magnetic layer being located directly on said mid portion of said first magnetic pole member and interposed between said first magnetic pole member and said nonmagnetic gap layer so as to be substantially coextensive with said smaller width of said second magnetic pole member, said additional magnetic layer underlying said nonmagnetic gap layer and being substantially coextensive therewith; and an associated magnetic layer that is formed of a material having a magnetic moment that is higher than said magnetic moment of said second magnetic pole member, said associated magnetic layer being located directly on said second magnetic pole member and interposed between said second magnetic pole member and said nonmagnetic gap layer, said associated magnetic layer underlying said second magnetic pole member and overlying said nonmagnetic gap layer, and said associated layer being substantially coextensive with said smaller width of said second pole member.

14. A magnetic data transducer incorporating a read head that is interposed between an upper magnetic shield layer having a magnetic moment, and a lower magnetic shield layer having a magnetic moment, and incorporating a write head that utilizes said upper magnetic shield layer as a bottom magnetic pole member, said upper magnetic shield layer having a width, and said write head comprising:

a flux enhancement layer having a width that is smaller than said width of said upper magnetic shield layer directly on and overlying a mid portion of said width of said upper magnetic shield layer, said flux enhancement layer having a magnetic moment that is higher than said magnetic moment of said upper magnetic shield layer;

a gap layer having a width that is generally equal to said smaller width of said flux enhancement layer directly overlying said flux enhancement layer;

an upper magnetic pole member having a width that is generally equal to said width of said gap layer directly on and overlying said gap layer, said upper magnetic pole member having a magnetic moment; and a seed layer having a magnetic moment generally equal to said magnetic moment of said upper magnetic pole member, said seed layer having a width that is generally equal to said width of said upper magnetic pole member, said seed layer being located directly on said upper magnetic pole member and between said upper magnetic pole member and said gap layer, said seed layer underlying said upper magnetic pole member and being substantially coextensive therewith.

15. In a magnetic data transducer of the type having a first NiFe magnetic pole piece, having a second narrower NiFe magnetic pole piece that forms a magnetic flux gap with said first magnetic pole piece, and a having an $Al_2O_3$ nonmagnetic gap layer that is located intermediate said first and second magnetic pole pieces, the improvement, comprising:

an additional magnetic layer selected from the group FeN and CoNiFe, said additional magnetic layer being located directly on said first magnetic pole piece so as to be between said first magnetic pole piece and said nonmagnetic gap layer, said additional magnetic layer being substantially coextensive with said nonmagnetic gap layer and said narrower second magnetic pole piece, and said additional magnetic layer being substantially between 500 Å to 2500 Å thick; and an associated magnetic layer selected from the group FeN and CoNiFe, said associated magnetic layer being located directly on said second magnetic pole piece so as to be between said second magnetic pole piece and said nonmagnetic gap layer, said associated magnetic layer being substantially coextensive with said nonmagnetic gap layer, and said associated layer being substantially 1.0 Å thick.

* * * * *